Dec. 14, 1926.　　　　T. BROWN　　　　1,610,420
WHEELED PLOW
Filed July 31, 1926
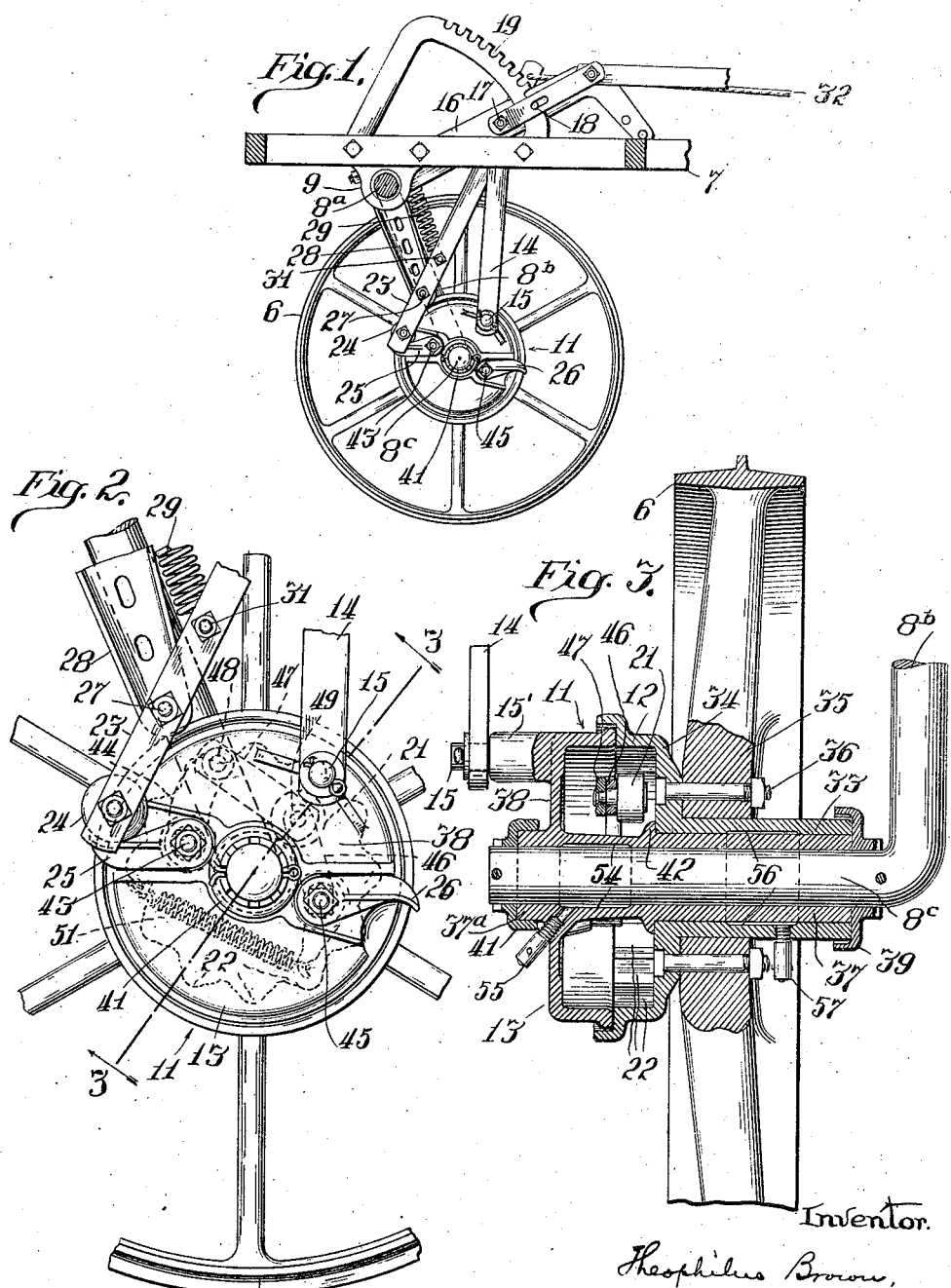

Patented Dec. 14, 1926.

1,610,420

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

WHEELED PLOW.

Application filed July 31, 1926. Serial No. 126,121.

The present invention relates generally to wheeled plows of the power lift type, and aims particularly to provide an improved construction and arrangement of bearings for the clutch mechanism and lifting wheel of such plows. A wheeled plow of this general type is exemplified in Reissue Patent No. 15,828 of Carl G. Strandlund, reissued April 29, 1924. According to the principle of operation characteristic of this type of plow, the plow frame and plow bodies are raised and lowered through rotational motion of the land wheel, which rotational motion is converted into a crank motion under the control of the manually controlled clutch associated with the land wheel. This crank motion is obtained through a link having eccentric or crank pin connection at one end with one of the elements of the clutch; the other end of the link has operative connection with the plow frame, so that the crank motion is operative to raise or lower the plow frame and plow bodies. The land wheel and the two elements of the aforesaid clutch are mounted coaxially on the spindle portion of a swinging crank axle, which permits the plow frame to move vertically relatively to the land wheel.

With this construction it inherently follows that in the operation of the apparatus, practically all of the stresses incident to lifting the plow or plows out of the ground are transmitted through the link and its crank pin connection to the bearing surfaces of the driven clutch element. Here these stresses are concentrated in the form of heavy radial loads imposed on the bearing surfaces of this driven clutch element and on the spindle portion of the swinging axle. Furthermore, owing to the fact that the crank pin connection with the lifting link is offset from the plane of the bearing surfaces of this latter clutch element, such stresses apply a cocking or tilting pressure to these bearing surfaces. In the arrangement and construction of the bearings illustrated in the aforesaid Strandlund patent, these bearing surfaces of the driven clutch element have been susceptible to rapid and irregular wear because of such stresses, and have required frequent attention and replacement.

It is the fundamental object of the present invention to provide an improved construction and arrangement of bearings for the clutch mechanism and land wheel of power lift plows, which bearings will have a greatly increased bearing area for carrying the radial and tilting loads of the connecting link. It is a further object to provide a construction and arrangement of bearings which will give a maximum length of bearing for the driven clutch element, while retaining the clutch mechanism and land wheel in an assembly of short axial length.

Referring to the accompanying drawing illustrating a preferred embodiment of my invention:

Figure 1 is a fragmentary vertical sectional view through the intermediate portion of a wheeled plow of the power lift type.

Figure 2 is an enlarged detail view of the land wheel and associated clutch mechanism, and Figure 3 is an axial sectional view through the land wheel and clutch unit, taken approximately on the plane of the line 3—3 of Figure 2.

In this drawing, only the portion of the plow adjacent the land wheel has been shown, as the invention pertains primarily to the bearing support of the land wheel and its associated clutch mechanism. The land wheel is indicated at 6 and the plow frame at 7. The front furrow wheel and the rear furrow wheels, if both are employed, and the plow body or plow bodies are connected to and supported by the frame 7 in a manner fully described in the aforesaid patent and well known to those skilled in the art.

The land wheel 6 is journaled for rotation about the spindle portion of a swinging crank axle. This axle comprises a horizontally extending portion $8^a$ which is journaled in spaced bearing brackets 9 bolted to the frame 7. At the landward side of the plow, this axle has a downwardly turned swinging arm portion $8^b$, the lower end of which is turned inwardly toward the furrow side of the plow to form a horizontal spindle portion $8^c$ on which the land wheel and its associated clutch unit 11 have coincident axial mounting.

The clutch 11 comprises in the main a driving clutch element 12 which rotates with the land wheel 6, and a driven clutch element 13 which is normally stationary, but which is adapted by its rotation to raise or lower the plow frame. This is effected through a link 14 which has connection at its lower end to a crank pin 15 extending from the driven clutch element and which has suitable connection at its upper end to the frame 7. The crank pin is formed at the end of a cylindrical enlargement 15' projecting from the side wall of the driven clutch element 13, so as to dispose the link 14 in a plane clearing the end of the spindle 8ᶜ. The connection between the upper end of the link and the plow frame 7 is preferably adjustable to adjust the depth of plowing. To this end, a manually operated depth adjusting lever 16 is pivoted for swinging movement about the axis of the horizontal axle portion 8ᵃ, and the upper end of the link 14 is pivoted to this lever at 17. The lever may be locked at various inclinations to dispose the pivot 17 at various heights, by engaging a latching dog 18 in any selected notch of a stationary notched segment 19.

To facilitate the understanding of the clutch mechanism and its associated control apparatus I shall briefly describe the same, it being understood, however, that this part of the construction is old, and per se forms no part of the present invention. The clutch members are adapted to be connected through an outwardly swinging spring actuated clutch roller 21 which is carried by the driven clutch member and is contained within the clutch housing. In its outward position this clutch roller engages in notches 22 formed in the inner circumference of the driving clutch element 12. The clutch roller is normally held in retracted, non-engaging position by a tripping lever 23, the lower end of which carries a roller 24 for engagement with the projecting ends of two swinging dogs 25 and 26 pivotally supported on the side wall of the driven clutch element 13. The dog 25 is mounted on a short bolt or stub shaft 43 which extends through this side wall and carries an arm 44 on its inner end. The stub shaft 45 of the other dog 26 similarly extends through the side wall of the clutch and carries a lever 46 on its inner end. A link 47 has pivotal connection at 48 to the arm 44 and at its other end has pivotal connection at 49 with one arm of the lever 46. The clutching roller 21 is supported on this latter pivot 49. A tension spring 51 connecting to the other arm of this lever 46 normally tends to swing the roller 21 outwardly into the notches 22.

The clutch is engaged for each operation of raising or lowering the plow frame through oscillation of the tripping lever 23. This tripping lever is pivoted at 27 to the lower end of an arm 28 non-rotatably supported on the horizontal axle portion 8ᵃ. A tension spring 29 connects at its lower end to a bolt 31 carried by the tripping lever, and at its front end has any suitable attachment to the frame. The tendency of this spring 29 is to swing the lower end of the tripping lever inwardly to dispose its roller 24 in the path of one of the dogs 25 or 26. A cable 32 or any other suitable operating member is connected to the upper end of the tripping lever 23, for actuating the tripping lever to disengage the roller 24 from either of the dogs 25 or 26.

Referring now to the improved construction and arrangement of the bearings for the land wheel and clutch mechanism as illustrated in Figure 3, it will be observed that the driving clutch element 12 comprises a long sleeve like bearing portion 33 and a circular open sided housing portion 34. The hub 35 of the land wheel 6 fits over this sleeve like bearing portion 33 and is secured to the thickened side wall of the housing portion 34 by bolts 36 which have their inner heads recessed in the inner wall thereof. It will be evident that this assembly compels the clutch element 12 to rotate continuously with the land wheel. The driven clutch element comprises a long sleeve like bearing portion 37, and a cylindrical housing portion 38 at the inner end thereof. This second bearing sleeve extends within the first bearing sleeve 33, preferably throughout the entire length thereof, being journaled directly on the spindle 8ᶜ. The two bearing sleeves are held against shifting at their outer ends by a sand or dirt cap 39, which is pinned to the spindle and is flanged over to embrace the ends of both sleeves. The other end of the inner bearing sleeve is held against shifting inwardly by a similar cap 41, pinned to the inner end of the spindle and having a flange which embraces the extending end portion 37ᵃ of the bearing sleeve. The outer bearing sleeve 33 is held against shifting inwardly by a flange 42 projecting from the inner sleeve 37 and abutting against the inner end of the outer sleeve.

In the operation of this power lift mechanism, the two clutch members are connected by oscillation of the tripping lever 23, which allows the clutch roller 21 to swing out into the notches 22. Thereupon the crank pin 15 revolves through a half revolution, the clutch being automatically disconnected at the completion of this half revolution by the engagement of the next succeeding dog 25 or 26 with the tripping lever roller 24. One half revolution of the crank pin operates to raise the plow frame through the link 14 and the other half revolution permits the plow frame to lower, each half revolution being under the control of the tripping lever 23.

It will be apparent that in the act of lifting the plow frame, the link 14 must sustain the entire pressure required to lift the plow bodies out of the ground. As above described, this imposes relatively heavy stresses on the bearing of the second clutch element 13, and where this bearing has been of relatively limited area, as in the aforesaid Strandlund patent, it has resulted in rapid wear of such bearing. Moreover, because of the leverage which the link 14 has on this bearing through its laterally disposed connection with the crank pin 15, there has been a tendency for it to wear irregularly. These stresses also result in the rapid wear of that portion of the spindle on which the bearing surfaces engage. Such difficulties have been avoided in the present construction. By extending the bearing sleeve 37 into the bearing sleeve 33, and preferably throughout the entire length of the spindle, I obtain a long length of bearing capable of carrying all such radial and tilting loads without undue wear either of the bearing sleeve or of the spindle. When the clutch is engaged, both elements of the clutch and the land wheel revolve around the spindle 8ᶜ as a journal. When the clutch is disengaged, the driving clutch element and the land wheel both revolve about the bearing sleeve 37 as a journal. This bearing sleeve affords a journal of large diameter for carrying the bearing loads set up in the normal rotation of the land wheel with the plow frame either raised or lowered.

The inner bearing sleeve 37 may be provided with an internal lubricant recess 54, supplied with lubricant through a nipple fitting 55, and the outer bearing sleeve 33 may be provided with a similar recess 56, supplied through a nipple fitting 57.

What I claim as my invention and desire to secure by Letters Patent, is—

1. In a power lift plow the combination with a wheeled frame comprising a crank axle and a land wheel mounted thereon, of driving and driven clutch members normally disconnected from each other, means operable to connect said clutch members, said driving clutch member being connected with the land wheel to rotate therewith and having an elongated tubular hub, and said driven clutch member having an elongated bearing portion journaled in said hub, and means connected with said driven clutch member and actuated by the rotation thereof to lift or lower said frame.

2. In a power lift plow, the combination with a wheeled frame comprising a crank axle and a land wheel mounted thereon, of driving and driven clutch members normally disconnected from each other, means operable to connect said clutch members, said driving clutch member being connected with the land wheel to rotate therewith, a bearing sleeve extending from said driven clutch member and rotatably supported on said crank axle, bearing means for said driving clutch member and for the land wheel rotatably supported on said bearing sleeve, and means connected with said driven clutch member and actuated by the rotation thereof to lift or lower said frame.

3. In a power lift plow, the combination with a wheeled frame comprising a crank axle and a land wheel rotating about said axle, of a clutch associated with said land wheel comprising driving and driven clutch elements, said driving clutch element constantly rotating with said wheel, a link connected at one end to said driven clutch element eccentrically thereof and connected at the other end to said frame, means for connecting said clutch elements, a bearing sleeve extending from said driven clutch element and rotatably supported on said axle, and bearing means for said driving clutch element and for said wheel rotatably supported on said bearing sleeve.

4. In a power lift plow, the combination with a wheeled frame comprising a crank axle and a land wheel rotating about said axle, of a clutch associated with said wheel comprising driving and driven clutch elements, said driving clutch element rotating with said land wheel, a crank pin on said driven clutch element, a link connected between said crank pin and said frame, means for connecting said clutch elements for transmitting the rotation of said wheel to said crank pin, a relatively long bearing sleeve extending from said driven clutch element and journaled on said axle, and bearing means for said driving clutch element and said wheel journaled on said sleeve.

5. In a power lift plow, the combination of a frame for carrying the plow body, a swinging axle connected to said frame and comprising a spindle portion, a wheel rotating concentrically of said spindle portion, a clutch associated with said wheel comprising driving and driven clutch elements, said driving clutch element rotating with said wheel, a link pivoted at one end to said driven clutch element eccentrically thereof and connected at its other end to said frame, means for connecting said clutch elements for transmitting driving rotation therebetween, a relatively long bearing sleeve extending from said driven clutch element and journaled on said spindle portion, and bearing means for said driving clutch element journaled on said bearing sleeve.

6. In a power lift plow, the combination of a frame for carrying the plow body, a swinging axle connected to said frame and comprising a spindle portion, a loud wheel rotating concentrically of said spindle portion, a clutch associated with said land wheel comprising driving and driven clutch elements, said driving clutch element rotating with said wheel, a crank pin carried by said driven clutch element, a link connected between said crank pin and said frame, means for operatively connecting said clutch elements, a bearing sleeve for said driven clutch element journaled on said spindle, a bearing sleeve for said driving clutch element and said wheel journaled on the first mentioned bearing sleeve, and a closure member mounted on said spindle at the outer ends of said sleeves and adapted to engage both of said sleeves to limit outward movement thereof.

7. In a power lift plow, the combination of a frame for carrying the plow body, a swinging axle connected to said frame and comprising a spindle portion, a land wheel rotating concentrically of said spindle portion, a clutch associated with said land wheel comprising driving and driven clutch elements, said driving clutch element rotating with said wheel, a crank pin carried by said driven clutch element, a link connected between said crank pin and said frame, means for operatively connecting said clutch elements, a bearing sleeve for said driven clutch element journaled on said spindle, a bearing sleeve for said driving clutch element and said wheel journaled on the first mentioned bearing sleeve, a cap secured to said spindle adjacent the outer ends of said sleeves and comprising a flange embracing the ends of both sleeves, and a second cap secured to said spindle adjacent the inner end thereof for engaging the inner end of said first bearing sleeve.

8. In a wheeled plow of the class described, the combination of a frame for carrying the plow body, a rockable axle journaled on said frame and having a downwardly extending swinging arm portion on the landward side of the machine and bent to form a spindle extending toward the furrow side of the machine, a land wheel for rotation about said spindle, a radially expanded intermittently driven clutch associated with said wheel and comprising driving and driven clutch elements, said driving clutch element rotating with said wheel, a crank pin extending inwardly from said clutch element, a link connected between said crank pin and said frame, a bearing sleeve formed integral with said driven clutch element and extending substantially the entire length of said spindle, and a bearing sleeve formed integral with said driving clutch element and journaled on the bearing sleeve of said driven clutch element.

9. In a plow of the class described, the combination of a frame for carrying the plow body, a swinging axle, a wheel mounted on said axle, cooperating clutch elements axially alined with said wheel, one of said clutch elements rotating with said wheel, a link connected at one end with said frame and pivotally connected at its other end to the other of said clutch elements eccentrically thereof, and means for connecting said clutch elements, said wheel during the disengaged condition of said clutch, rotating on a journal portion constituting a part of one of said clutch elements, said wheel and said journal portion both rotating about said spindle when said clutch is engaged.

10. In a plow of the class described, the combination of a frame for carrying the plow body, a movable axle, a wheel rotating concentrically of said axle, a clutch associated with said wheel comprising driving and driven clutch elements, said driving clutch element rotating with said wheel, a link having crank connection at one end with said driven clutch element and connected at its other end to said frame, means for engaging said clutch, and a bearing sleeve for one of said clutch elements journaled on said axle, said bearing sleeve constituting a journal about which said wheel revolves when said clutch is disengaged, said wheel and said bearing sleeve both revolving about said axle as a journal when said clutch is engaged.

11. In a plow of the class described, the combination of a frame for carrying the plow body, a swinging axle connected to said frame, a wheel rotating concentrically of said axle, a clutch associated with said wheel comprising driving and driven clutch members, a clutch roller carried by said driven clutch member adapted to engage in notches in said driving clutch member, spring means normally tending to force said roller into one of said notches, means adapted to be tripped for holding said roller out of said notches, a crank pin extending from said driven clutch member, a link pivotally connected at its lower end to said crank pin, means connecting the upper end of said link to said frame, means for adjusting said latter connecting means, bolts for detachably connecting said wheel to said driving clutch member, a bearing sleeve extending from said driven clutch member along substantially the entire length of said axle, a bearing sleeve extending from said driving clutch member and journaled in its entirety on said first bearing sleeve, closure members at the ends of said axle engaging the outer ends of both of said sleeves at one end of said axle and the inner end of said first sleeve at the opposite end of said axle, and a flange projecting from said first bearing sleeve and engaging the inner end of said second bearing sleeve.

THEOPHILUS BROWN.